United States Patent
O'Brien et al.

(10) Patent No.: US 8,629,871 B2
(45) Date of Patent: Jan. 14, 2014

(54) SYSTEMS AND METHODS FOR RENDERING THREE-DIMENSIONAL OBJECTS

(75) Inventors: Daniel O'Brien, Cambridge, MA (US); William Dan Ogles, Jamaica Plain, MA (US); Nabeel Hyatt, Cambridge, MA (US)

(73) Assignee: Zynga Inc., San Francisco, CA (US)

( * ) Notice: Subject to any disclaimer, the term of this patent is extended or adjusted under 35 U.S.C. 154(b) by 630 days.

(21) Appl. No.: 12/330,300

(22) Filed: Dec. 8, 2008

(65) Prior Publication Data

US 2010/0045670 A1 Feb. 25, 2010

Related U.S. Application Data

(60) Provisional application No. 60/992,976, filed on Dec. 6, 2007.

(51) Int. Cl.
*G06T 17/00* (2006.01)

(52) U.S. Cl.
USPC .................. 345/420; 345/419; 345/582

(58) Field of Classification Search
None
See application file for complete search history.

(56) References Cited

U.S. PATENT DOCUMENTS

| | | | | | |
|---|---|---|---|---|---|
| 6,038,031 | A | * | 3/2000 | Murphy | 382/254 |
| 6,359,618 | B1 | * | 3/2002 | Heirich | 345/426 |
| 6,389,504 | B1 | * | 5/2002 | Tucker et al. | 711/100 |
| 7,619,626 | B2 | * | 11/2009 | Bernier | 345/427 |
| 2002/0114509 | A1 | * | 8/2002 | Takeuchi et al. | 382/154 |
| 2006/0067573 | A1 | * | 3/2006 | Parr et al. | 382/154 |
| 2006/0284880 | A1 | * | 12/2006 | Zhou et al. | 345/582 |

* cited by examiner

*Primary Examiner* — Said Broome
(74) *Attorney, Agent, or Firm* — Schwegman, Lundberg & Woessner, P.A.

(57) ABSTRACT

In one embodiment, a three-dimensional object is rendered on a two-dimensional display screen by associating a three-dimensional mesh with an image of the object, generating a vector-based texture map that defines a surface area of the object, and rendering the vector-based texture map on the display screen.

20 Claims, 9 Drawing Sheets

101 3D POLYGONAL MESH

102 VECTOR TEXTURE PAGE

103 TEXTURED MESH

SYSTEMS AND METHODS FOR RENDERING THREE-DIMENSIONAL OBJECTS

TECHNICAL FIELD

In various embodiments, the present invention relates to systems and methods for rendering three-dimensional ("3D") objects.

BACKGROUND

Computer graphics systems typically generate what appears to be a 3D object on a two-dimensional ("2D") display by generating 2D views of the 3D object that are modeled in computer memory. The graphics system typically renders a 3D graphic of the object by subdividing the 3D object into a model or mesh having a set of polygons, and then projecting that model or mesh into 2D space based on the point of view of a camera that records an image of the object. The polygons are then typically sorted by depth in the z-axis using z-buffering or other techniques, so that polygons which would have been occluded in a true 3D environment are hidden.

In general, the surface area of the 3D object is defined by a texture map, which is an efficient way to describe the details of an image. The texture map is generally a two-dimensional array of texture pixels, known as texels, created off-line. These values may define color, reflectivity, surface roughness, transparency, or virtually any other attribute. For example, a 3D object of a soccer ball may have an associated texture map that defines its general color as white with black hexagonal lines.

Historically, while the data for the 3D model or mesh is vector-based polygons, the associated texture map for the model or mesh is a set of raster-based bitmap images. The bitmap images typically define the kind of photo-realistic textures that would appear in a naturalistic 3D environment. In one exemplary prior art system, a 3D rasterizer takes a projected soccer ball, looks at each pixel in (x, y, z) space, and correlates it to a texel on a corresponding (u, v) texture map.

One downside of bitmaps is that any raster image is a defined set of pixels, and thus scales with a loss of clarity. This is in contrast to vector graphics, which use a set of geometrical data such as curves and points to define an object. In 2D computer graphics, bitmaps are generally used for photorealistic images, and vectors are generally used for illustrations, logos, typography, or highly stylized graphics. In those cases, the vector graphics results in much smaller data size, as well as resolution independence.

SUMMARY OF THE INVENTION

In various embodiments, the present invention provides a method for applying a vector-based texture map to a 3D object. Resolution independence, style, and/or data compactness make having a vector-based texture map preferable to traditional bitmap-based texture maps. In one embodiment, the present invention provides a method for employing vector-based texture maps in any environment. In one particular embodiment, the present invention is used in a system where the software application responsible for rendering is a vector-based renderer.

In one embodiment, a method is provided for a software application to render 3D assets and animations on a 2D vector-based renderer. This method involves using a traditional 3D model or mesh in combination with a vector-based texture map. In producing an applied vector texture, vector control points may be added to the curves of the texture map in any location where the curves intersect with a face of the 3D model or border the model. This resulting applied vector texture is then projected into 2D screen space and grouped by z region. This pre-rendering process allows the software application responsible for rendering to use the applied texture, animation information, and z region data to draw a set of 2D shapes to represent an animated 3D model.

In a computationally constrained environment, portions of this pre-rendering process may be moved from client to server. In bandwidth constrained environments, animation data may be compared on a face-by-face basis so that only faces which are newly visible are sent down to the renderer.

In general, in one aspect, a method for rendering a three-dimensional object includes associating a three-dimensional mesh with an image of the three-dimensional object, generating a vector-based texture map to define a surface area of the three-dimensional object, and rendering the vector-based texture map on a two-dimensional display screen to represent the three-dimensional object.

In general, in another aspect, a system for rendering a three-dimensional object includes an association module for associating a three-dimensional mesh with an image of the three-dimensional object, a mapping module for generating a vector-based texture map defining a surface area of the three-dimensional object, and a renderer for rendering the vector-based texture map on a two-dimensional display screen to represent the three-dimensional object.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DESCRIPTION

A. Overview

In broad overview, the present invention, in various embodiments, relates to systems and methods for rendering 3D objects in a computer graphics system using vector-based texture maps.

Figure 1:
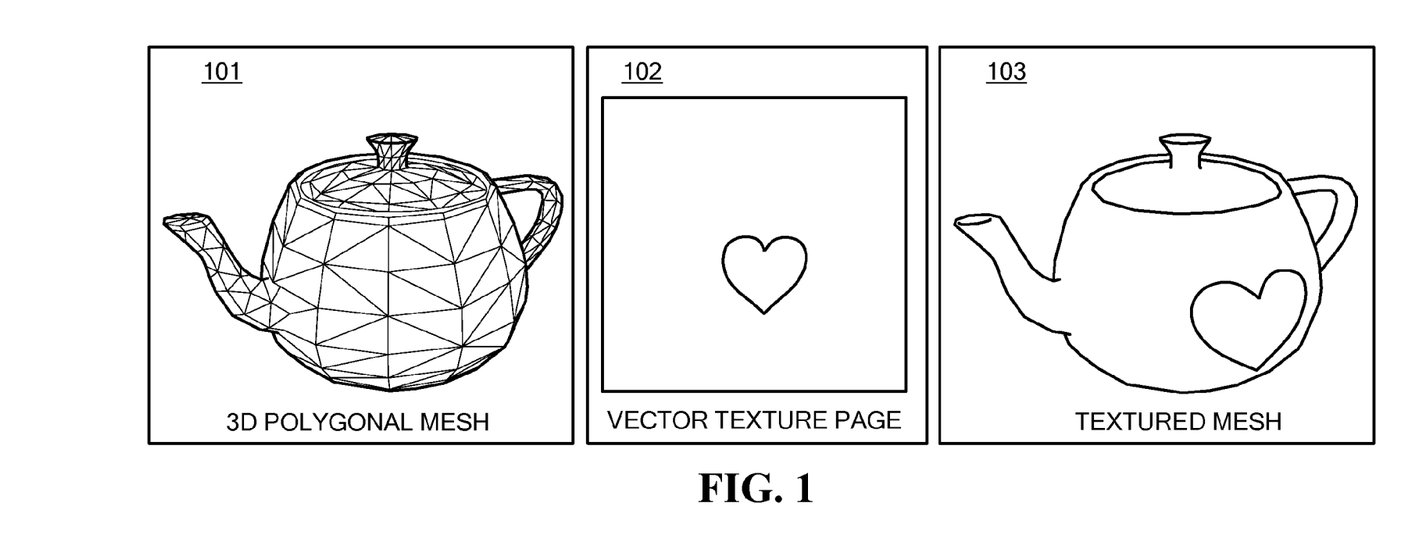
FIG. 1 illustrates the major components of an asset in accordance with one embodiment of the invention: a 3D polygonal model or mesh 101, a vector texture page 102, and a textured mesh 103.

With reference to FIG. 1, as in traditional 3D rendering, a 3D mesh 101 is associated with a texture—an image to be drawn on the 3D mesh 101—and each triangle in the mesh 101 corresponds to a triangular section of the texture. In embodiments of the present invention, vector textures 102, instead of bitmap textures, are used.

Figure 2:
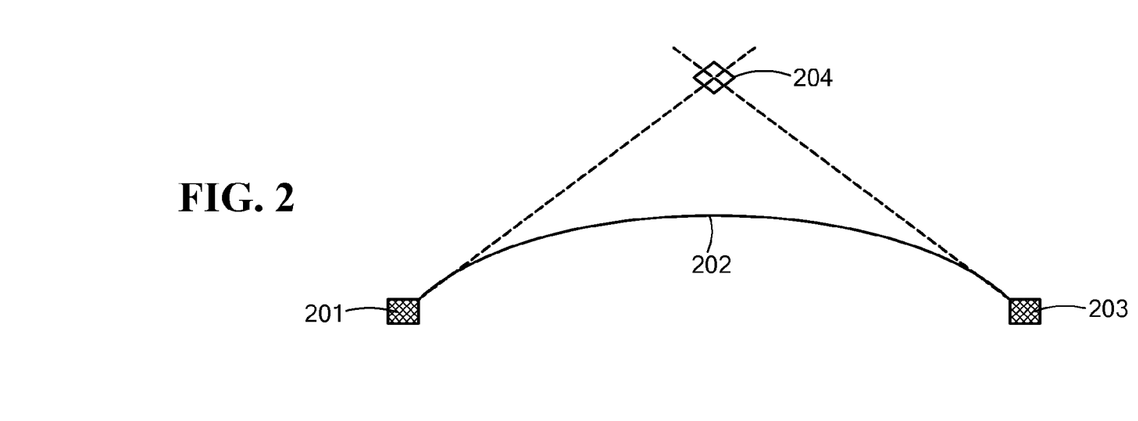
FIG. 2 illustrates the elements of a vector texture in accordance with one embodiment of the invention: a curve 202, vertices 201, 203 defining the start and end points of the curve 202, and a control point 204 that defines a tangent to the curve 202 at each of the two vertices 201, 203.
Figure 3:
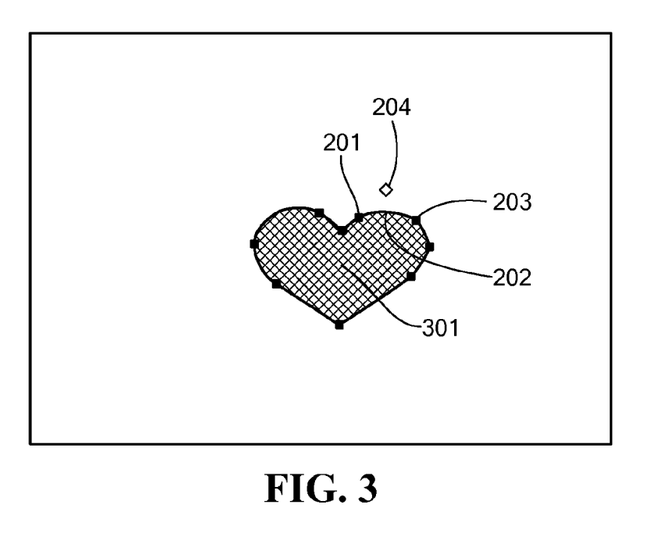
FIG. 3 illustrates a sample vector texture in accordance with one embodiment of the invention.

With reference to FIGS. 2 and 3, vector textures 102 are, in one embodiment, lists of "vertices" 201, 203, curves 202, and "fill colors" 301. Vertices define the locations of important points in the image, such as a starting point 201 and an ending point 203 of a curve 202. Curves 202 join vertices together to define color boundaries. In accordance with certain embodiments of the invention, a curve 202 is either a line segment (i.e., a line between vertices A and B) or a quadratic bezier (i.e., a curve starting at vertex A and ending at vertex B, using a vertex C—such as vertex 204—as a control point). The techniques of the present invention may also be applied to more general curves, such as cubic beziers.

With reference to FIG. 3, each curve 202 may have a fill color 301 defined for its left and right, which specifies the color of the image in that area. In one embodiment, for the image to be well defined, the fill colors 301 of the curves 202 in a vector texture are consistent (i.e., no two curves 202 disagree about the color of a particular area). This may be achieved automatically with typical vector image authoring tools.

B. Applying a Vector Texture to a Mesh

Figure 4:
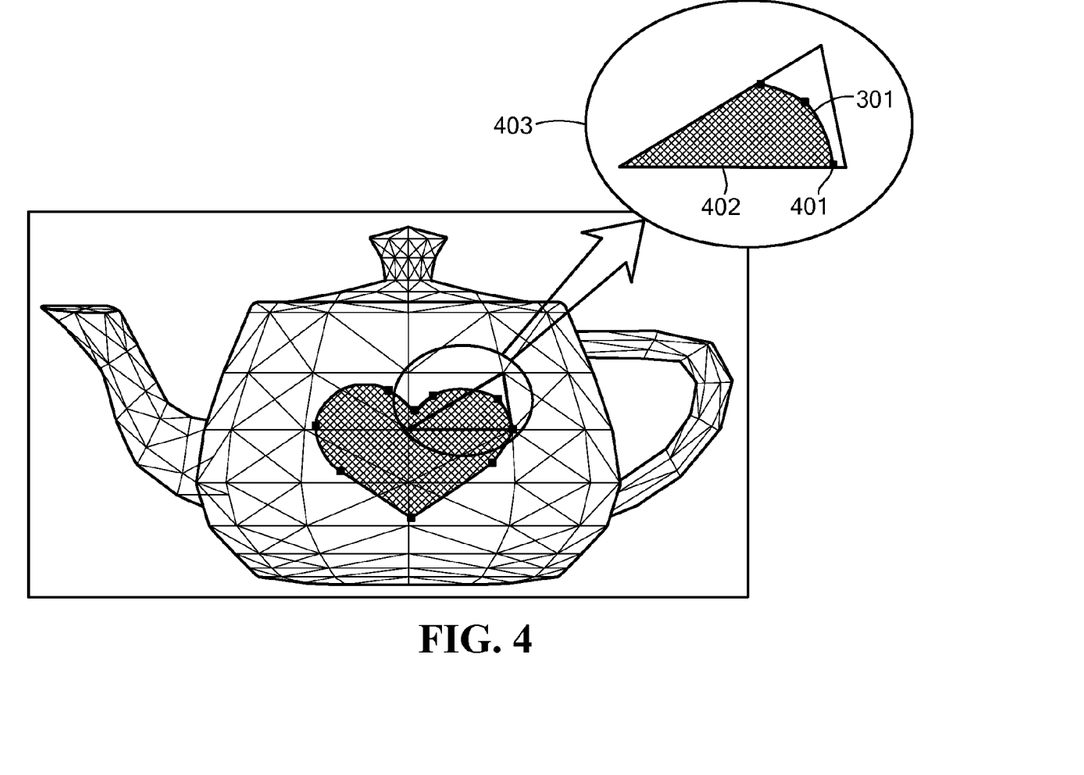
FIG. 4 illustrates an application of a vector texture to a mesh in accordance with one embodiment of the invention, in which control points are added for curves that go outside a given mesh triangle and lines are added for the borders of the mesh triangle.

With reference to FIG. 4, since each triangle in a mesh 403 is to be drawn at a different angle (based on its location and orientation with respect to a camera used to capture an image of the object), the vector texture is, in one embodiment, cut into triangular pieces—one for each triangle in the mesh 403. Conceptually, each of these triangular pieces is its own small vector image, comprising or consisting essentially of:

i) All curves from the original texture that are completely contained within the triangle, if any;

ii) Partial curves from the original texture. Curves that intersect any triangle edges are split at intersection point(s) 401, and reduced to only the part(s) of the curve contained within the triangle; and iii) Triangle edges. New curves (i.e., line segments) are created for the three edges 402 of the triangle, with appropriate fill colors 301.

For purposes of efficiency and to reduce memory consumption, data may be shared between the triangular pieces; they need not be literally separate texture images in memory.

Figure 4A:
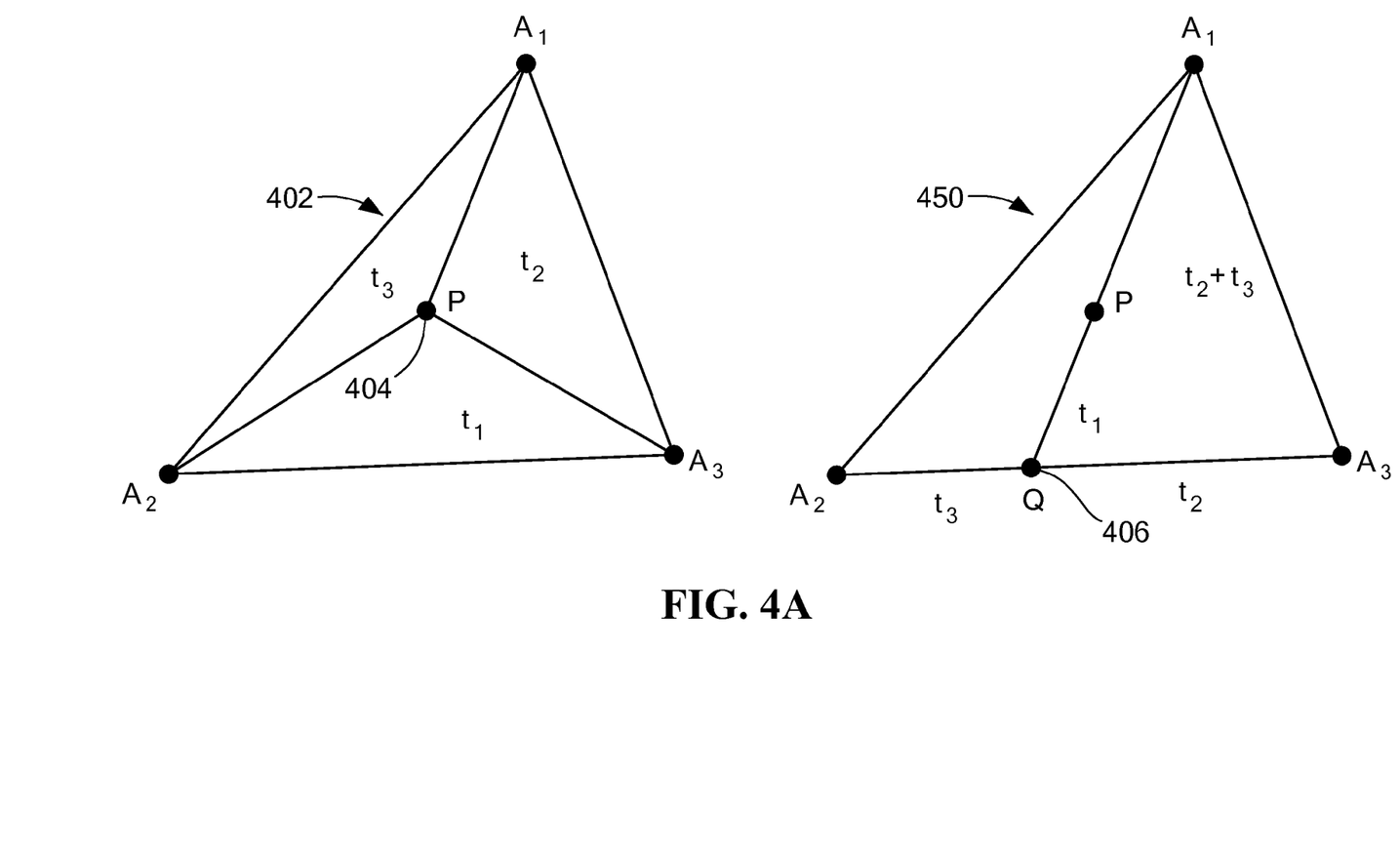
FIG. 4A illustrates conceptually barycentric coordinates.

Further, for each vertex in the triangular image, barycentric coordinates may be computed with respect to the triangle in which it is contained so that it may be properly projected into space later. With reference to FIG. 4A, Barycentric coordinates are triples of numbers ($t_1$, $t_2$, $t_3$) corresponding to masses placed at the vertices of a reference triangle $\Delta A_1, A_2, A_3$, (402). These masses then determine a point P, (404), which is the geometric centroid of the three masses and is identified with coordinates ($t_1$, $t_2$, $t_3$). The vertices of the triangle are given by (1,0,0), (0,1,0), and (0,0,1). To find the barycentric coordinates for an arbitrary point P, find $t_2$ and $t_3$ from the point Q at the intersection of the line $A_1P$ with the side $A_2A_3$, and then determine $t_1$ as the mass at $A_1$ that will balance a mass $t_2+t_3$ at Q, thus making P the centroid (FIG. 4A, 450). Furthermore, the areas of the triangles $\Delta A_1A_2P$, $\Delta A_1A_3P$, and $\Delta A_2A_3P$ are proportional to the barycentric coordinates $t_3$, $t_2$, and $t_1$ of P (See FIG. 4A, 402). Barycentric coordinates are homogeneous, so $$(t_1, t_2, t_3) = (pt_1, pt_2, pt_3) \quad (1)$$

for $p \neq 0$. Barycentric coordinates may be normalized so that they become the actual areas of the subtriangles are called homogeneous barycentric coordinates. Barycentric coordinates may be normalized so that $$t_1 + t_2 + t_3 = 1, \quad (2)$$

so that the coordinates give the areas of the subtriangles normalized by the area of the original triangle are called areal coordinates.

C. Drawing the Triangles

Figure 5:
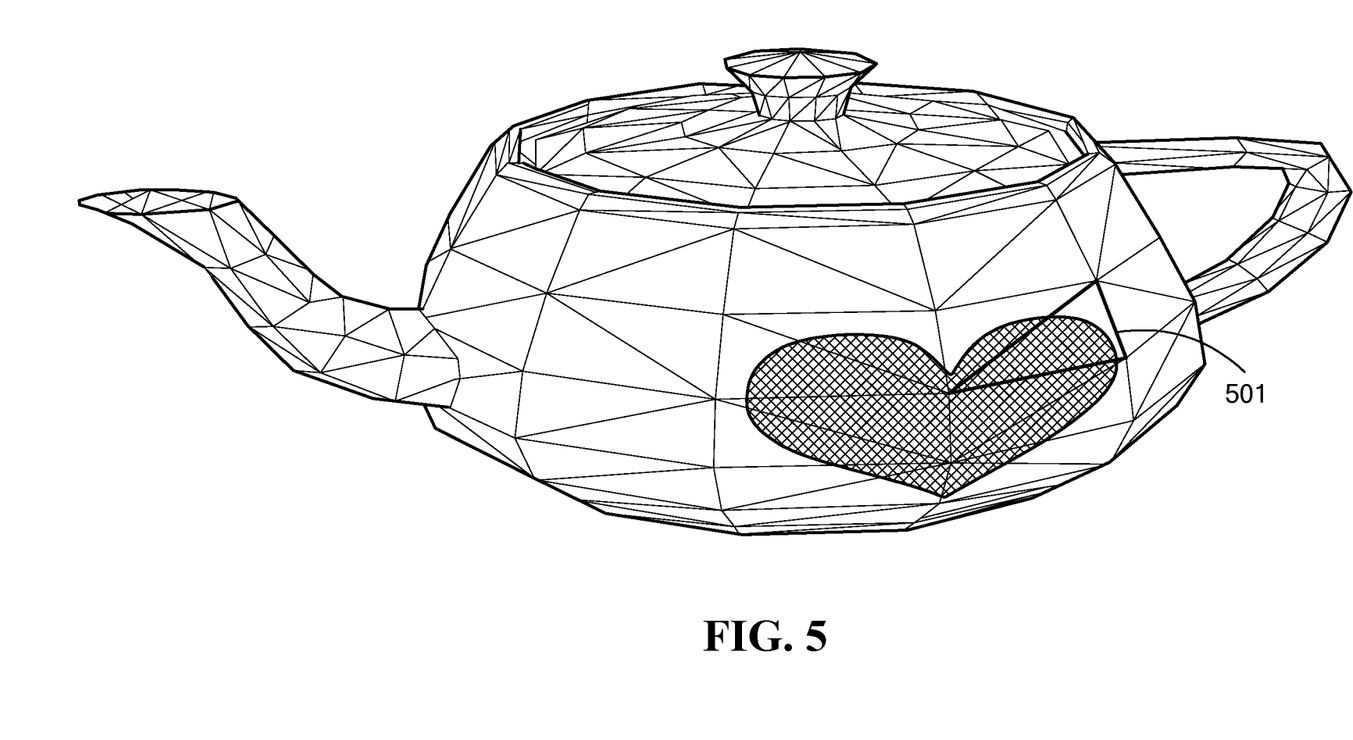
FIG. 5 illustrates the process of projecting the 2D applied vector textures into 3D space and correcting for perspective in accordance with one embodiment of the invention.

In one embodiment, the next step is to convert the triangle sections into new 2D vector images, adjusted to the correct location and in the correct perspective so that they are ready for rendering, as depicted in FIG. 5, with a vector graphics engine.

In one embodiment, the three vertices of each triangle are projected into screen space using traditional methods, taking into account the location of the vertex in 3D space and the position and orientation of the camera used to record an image of the object. The location of all curve vertices in the vector triangle may also be converted into screen space. This may be achieved, for example, by applying the barycentric coordinates of each curve vertice to the 2D screen coordinates of the triangle vertices. A new vector image for each triangle may then be generated, using exactly the curves and fill colors in the triangular piece, but with the new screen-space vertex locations. In one embodiment, rendering all of these triangles with an existing vector graphics engine, provided that they are drawn in the correct back-to-front order as described below, generates the desired result.

D. Z-Region Buffering

In one embodiment, in order to draw the 3D image correctly, the triangles are drawn in back-to-front order. Triangles further away from the camera may be partially or entirely occluded by those closer. In one embodiment, this back-to-front sorting of triangles is performed using traditional methods such as "z-sorting" or "painter's algorithm." Cases for which triangles cannot be sorted perfectly may exist (e.g., triangle A is to be drawn before triangle B, triangle B is to be drawn before triangle C, but triangle C is to be drawn before A), but an arbitrary drawing order for such cases has been found to work well in practice.

Applying this triangle drawing method directly means drawing as many "shapes" in the vector rasterizer as there are camera-facing triangles in the model or mesh. The number of shapes to be drawn may be reduced, however, and with an improvement in performance, if triangles that do not overlap in screen space are combined into a single shape for rasterization. An exemplary algorithm for achieving this reduction in the number of triangles to be drawn, in which a set of combined triangles is referred to as a "z-region," proceeds as follows:

1. Z-sort all triangles into a list.
2. Start with an empty z-region.
3. Look at the next triangle in the list. Does it overlap with any triangles in the current z-region?
   a) If no, add it to the current z-region and repeat step 3.
   b) If yes, the current z-region is complete. Record it, start a new z-region containing only this triangle, and repeat step 3.

The result of this exemplary algorithm is a sorted list of z-regions, each containing a set of triangles to be drawn. Since they do not self-overlap, each of these z-regions may be drawn as a single shape in the vector rasterizer.

Additional improvements may then be made to increase the speed with which a z-region is drawn. Consider, for example, a simple texture that is one solid color. In this example, only the overall boundaries of the z-region with its correct fill colors need to be drawn; internal triangles edges may be removed since there are no visible changes created by a filled area next to an identically colored filled area.

In the general case, a triangle edge may be removed from the list of curves to be drawn when the following conditions are met:

i) the edge is shared between two triangles in the mesh (i.e., adjacent triangles in 3D);
ii) the edge is shared by the same triangles in the vector texture (i.e., adjacent triangles in the 2D vector texture);
iii) both of these triangles are visible; and
iv) both triangles are in the same z-region.

In one embodiment, applying this method to remove as many triangle edges as possible from the z-region improves drawing performance, particularly when most adjacent triangles in the mesh are also adjacent in the vector texture (which is typical with traditional 3D modeling tools and standard practices).

E. Client-Server Environment

When the processes of texture application and z-region splitting are too costly for a renderer to perform in real-time, such as in cases where the renderer has no access to hardware acceleration, it may be beneficial to perform some of these calculations on a centralized server. On-demand rendered data may then be streamed to the client renderer for final projection.

The data sent to a client for this purpose may include:

i) The applied texture, including, but not limited to, mesh topology information (i.e., which triangles are adjacent to which triangles), a set of curves and fill colors for all triangle pieces (including which curves represent the triangle edges), and barycentric coordinates for all texture vertices.
ii) The z-region in which each visible triangle is located.
iii) Screen location of the mesh vertices (to reduce the amount of data sent to the client, this may only include the vertices that are a part of at least one visible triangle).

In one embodiment, this is sufficient data for the client to quickly assemble a vector shape for each z-region, which may then be passed to the vector graphics engine for rendering.

Figure 6A:
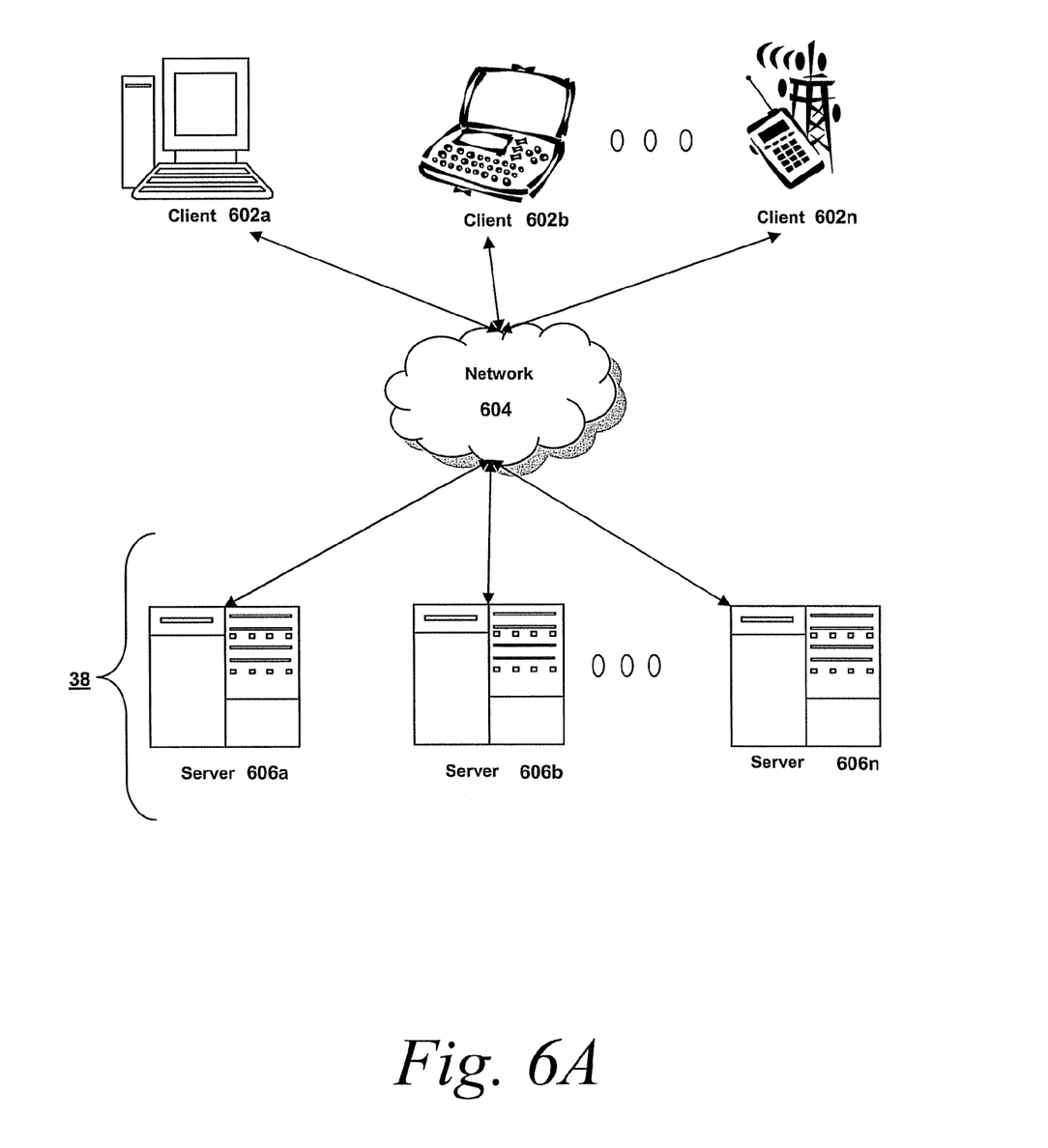
FIG. 6A illustrates a network environment in which the invention may be used.

Referring now to FIG. 6A, an embodiment of a network environment is depicted. In brief overview, the network environment comprises one or more clients 602a-602n (also generally referred to as local machine(s) 602, or client(s) 602) in communication with one or more servers 606a-606n (also generally referred to as server(s) 606, or remote machine(s) 606) via one or more networks 604.

The servers 606 may be geographically dispersed from each other or from the clients 602 and communicate over a network 604. The network 604 can be a local-area network (LAN), such as a company Intranet, a metropolitan area network (MAN), or a wide area network (WAN), such as the Internet or the World Wide Web. The network 604 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 604 may comprise a wireless link, such as an infrared channel or satellite band. The topology of the network 604 may be a bus, star, or ring network topology. The network 604 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

A server 606 may be referred to as a file server, application server, web server, proxy server, or gateway server. In one embodiment, the server 606 provides functionality of a web server. In some embodiments, the web server 606 comprises an open-source web server, such as the APACHE servers maintained by the Apache Software Foundation of Delaware. In other embodiments, the web server executes proprietary software, such as the Internet Information Services products provided by Microsoft Corporation of Redmond, Wash., the SUN JAVA web server products provided by Sun Microsystems, of Santa Clara, Calif., or the BEA WEBLOGIC products provided by BEA Systems, of Santa Clara, Calif.

The clients 602 may be referred to as client nodes, client machines, endpoint nodes, or endpoints. In some embodiments, a client 602 has the capacity to function as both a client node seeking access to resources provided by a server and as a server providing access to hosted resources for other clients 602a-602n. A client 602 may execute, operate or otherwise provide an application, which can be any type and/or form of software, program, or executable instructions such as any type and/or form of web browser, web-based client, client-server application, an ActiveX control, or a Java applet, or any other type and/or form of executable instructions capable of executing on client 602. The application can use any type of protocol and it can be, for example, an HTTP client, an FTP client, an Oscar client, or a Telnet client.

Figure 6B:
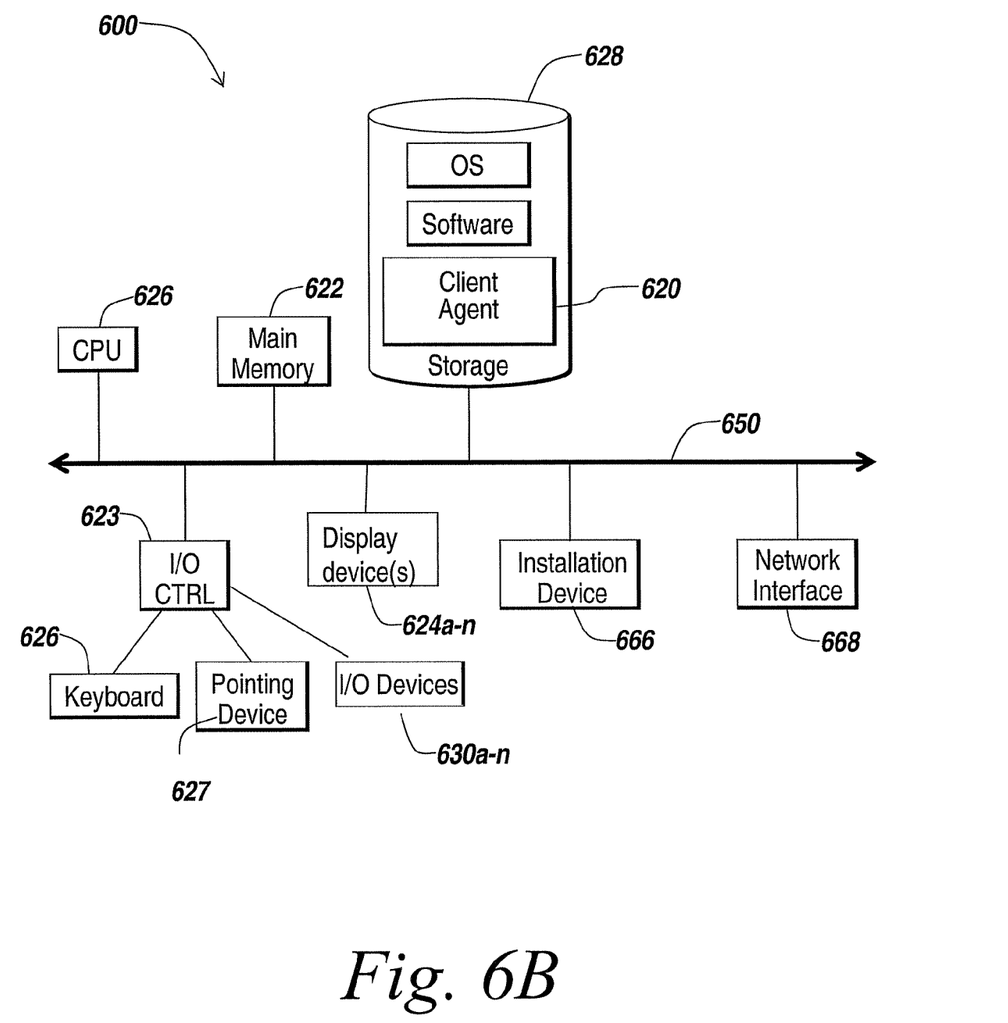
FIG. 6B is a block diagram of an embodiment of a machine suitable for use as a client or a server.

The client 602 and server 606 may be deployed as and/or executed on any type and form of computing device, such as a computer, network device or appliance capable of communicating on any type and form of network and performing the operations described herein. FIG. 6B depicts a block diagram of a computing device 600 useful for practicing an embodiment of the client 602 or a server 606. As shown in FIG. 6B, each computing device 600 includes a central processing unit 621, and a main memory unit 622. As shown in FIG. 6B, a computing device 600 may include a visual display device 624, a keyboard 126 and/or a pointing device 627, such as a mouse.

The central processing unit 621 is any logic circuitry that responds to and processes instructions fetched from the main memory unit 622. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 600 may be based on any of these processors, or any other processor capable of operating as described herein.

The computing device 600 may include a network interface 618 to interface to a Local Area Network (LAN), Wide Area Network (WAN) or the Internet through a variety of connections including, but not limited to, standard telephone lines, LAN or WAN links (e.g., 802.11, T1, T3, 56kb, X.25), broadband connections (e.g., ISDN, Frame Relay, ATM), wireless connections, or some combination of any or all of the above. The network interface 618 may comprise a built-in network adapter, network interface card, PCMCIA network card, card bus network adapter, wireless network adapter, USB network adapter, modem or any other device suitable for interfacing the computing device 600 to any type of network capable of communication and performing the operations described herein.

A wide variety of I/O devices 630a-630n may be present in the computing device 600. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 623 as shown in FIG. 6B. The I/O controller may control one or more I/O devices such as a keyboard 626 and a pointing device 627, e.g., a mouse or optical pen. Furthermore, an I/O device may also provide storage and/or an installation medium 616 for the computing device 600. In still other embodiments, the computing device 600 may provide USB connections to receive handheld USB storage devices such as the USB Flash Drive line of devices manufactured by Twintech Industry, Inc. of Los Alamitos, Calif.

In some embodiments, the computing device 600 may comprise or be connected to multiple display devices 624a-624n, which each may be of the same or different type and/or form. As such, any of the I/O devices 630a-630n and/or the I/O controller 623 may comprise any type and/or form of suitable hardware, software, or combination of hardware and software to support, enable or provide for the connection and use of multiple display devices 624a-624n by the computing device 600. For example, the computing device 600 may include any type and/or form of video adapter, video card, driver, and/or library to interface, communicate, connect or otherwise use the display devices 624a-624n. In one embodiment, a video adapter may comprise multiple connectors to interface to multiple display devices 624a-624n. In other embodiments, the computing device 600 may include multiple video adapters, with each video adapter connected to one or more of the display devices 624a-624n. In some embodiments, any portion of the operating system of the computing device 600 may be configured for using multiple displays 624a-624n. In other embodiments, one or more of the display devices 624a-624n may be provided by one or more other computing devices, such as computing devices 600a and 600b connected to the computing device 600, for example, via a network. These embodiments may include any type of software designed and constructed to use another computer's display device as a second display device 624a for the computing device 600. One ordinarily skilled in the art will recognize and appreciate the various ways and embodiments that a computing device 600 may be configured to have multiple display devices 624a-624n.

In further embodiments, an I/O device 630 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 600 of the sort depicted in FIG. 6B typically operates under the control of operating systems, which control scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MACOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others. A server 606 and a client 602 may be heterogeneous, executing different operating systems.

In some embodiments, the computing device 600 may have different processors, operating systems, and input devices consistent with the device. For example, in one embodiment the computing device 600 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 600 is a mobile device, such as a JAVA-enabled cellular telephone or personal digital assistant (PDA), such as the i55sr, i58sr, i85s, i88s, i90c, i95cl, or the iM1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea.

In still other embodiments, the computing device 600 is a Blackberry handheld or smart phone, such as the devices manufactured by Research In Motion Limited, including the Blackberry 7100 series, 8700 series, 7700 series, 7200 series, the Blackberry 7520, or the Blackberry PEARL 8100. In yet other embodiments, the computing device 600 is a smart phone, Pocket PC, Pocket PC Phone, or other handheld mobile device supporting Microsoft Windows Mobile Software. Moreover, the computing device 600 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 600 comprises a combination of devices, such as a mobile phone combined with a digital audio player or portable media player. In one of these embodiments, the computing device 600 is a Motorola RAZR or Motorola ROKR line of combination digital audio players and mobile phones. In another of these embodiments, the computing device 600 is an iPhone smartphone, manufactured by Apple Computer of Cupertino, Calif.

F. Animation Compression

Animation data for moving the 3D models may be created offline by traditional methods. As in traditional 3D rendering, animation may be achieved by changing the camera location or orientation, by moving meshes in the scene, or by deforming meshes (i.e., moving a mesh's individual vertices around). This data may then used to create a set of framed animations, where each frame of the animation is processed by the methods described above to generate a vector texture.

Figure 7A:
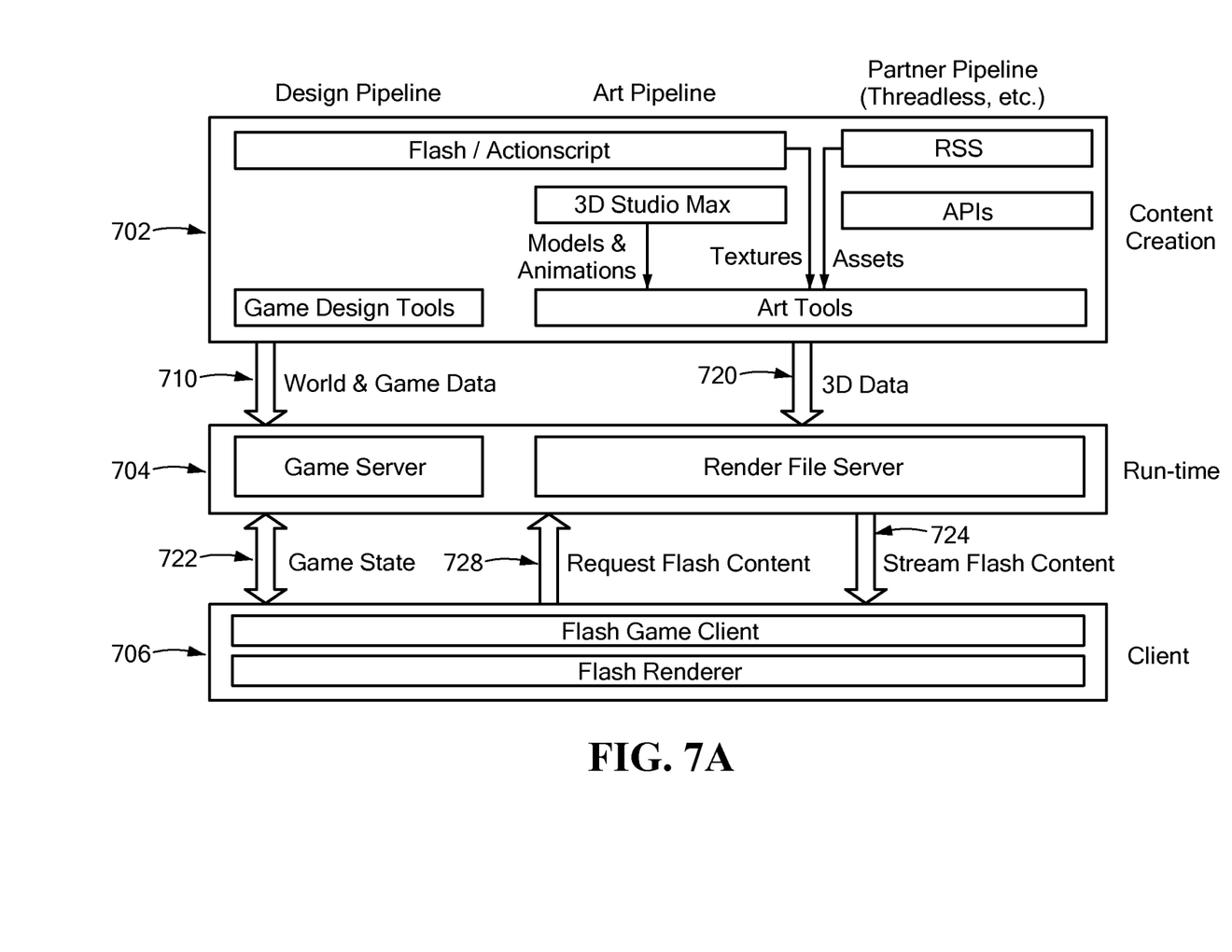
FIG. 7A is a block diagram of an embodiment of a system for rendering three-dimensional images.

Referencing now to FIG. 7A, one embodiment of a system 700 that can be used to create three-dimensional media. As shows in FIG. 7A, the system 700 includes a content creation stage 702, a run-time stage 704, and a client 706. The content creation stage 702 is used to create game data 710, such as environment data and character data. Any of a number of well-known game design tools can be used to create game data 710. Additionally, content stage 702 is used to create three-dimensional data 720 for use by the run time-stage 704. The run-time stage 704 provides game data 722 and three-dimensional content 724 to the client 706 in response to client request 728. As shown in FIG. 7A, the client uses Flash Player, manufactured by Adobe Systems to render the content 724 and game state 722 into a user experience. In some embodiments, Flash Player is used as a plug-in to a web browser, such as Internet Explorer or Firefox.

In cases where a server is used in the rendering, the data streamed to a client may be reduced by only sending the parts of the model that have changed from frame to frame. For example, in one embodiment, the applied texture (e.g., mesh topology and textured triangle information) does not change between animation frames; therefore, it need only be sent to the client once no matter how long the animation lasts. Then, for the per-frame data, sending triangle information and vertex information in separate lists may be avoided; instead, the z-region information may be encoded directly into the per-vertex data. For this purpose, in one embodiment, a "visible vertex" is defined as any vertex that is a vertex of at least one visible triangle. Then, the screen positions of vertices that are not visible are not sent to the client. In addition, a "z-region of a visible vertex" may be defined as the largest (furthest from the camera) z-region of any of the vertex's visible triangles. The "z-region of a visible vertex" may be employed as described below.

In one embodiment, once compressed, the data for a full animation by a client includes an applied vector texture, the vector data for the full first frame, and the compressed per-frame data. The compressed per-frame data may include:

(a) The list of newly-visible mesh vertices (i.e., those vertices which were not visible in the last frame, but now are).

(b) The list of newly-invisible mesh vertices (i.e., those vertices which were visible in the last frame, but now are not).

(c) The screen x/y location for all visible vertices. For newly-visible vertices, this may be an absolute position; for vertices that are still visible from the previous frame, this may be a delta from the previous frame, which may be compressed to fewer bits.

(d) The z-region of each visible mesh vertex. Again, for vertices that are still visible from the previous frame, this may be a delta, which may be compressed to fewer bits.

(e) Corrections for any triangles whose z-region is not the maximum of the z-regions of its three vertices. These corrections may be the difference between the triangle's actual z-region and that which the client computes. This number is typically small and may be compressed into just a few bits.

In one embodiment, the implied list of visible vertices derived from information components (a) and (b) described above indicates to the client which vertices it will then receive screen positions for. Note, however, that this is not used to infer triangle visibility; a non-visible triangle may, in some cases, have three visible vertices.

Following the receipt of information component (c) described above, the client may determine the set of visible triangles. In one embodiment, triangles wound counter-clockwise (or clockwise depending on the coordinate system used) in screen space are visible. For efficiency, triangles with any non-visible vertices may be marked as non-visible without checking the winding. As used herein, the "winding" of a triangle refers to the direction in which the triangle is circulated in moving from its first vertex to its second vertex and then to its third vertex.

Following the receipt of information component (d) described above, the client may compute the z-region for each triangle as the maximum of the z-region of its vertices. This is typically the correct z-region value for the majority triangles, but not all, so a handful of corrections may then be applied using the data from information component (e) described above.

Accordingly, using this information, the client may achieve a full 3D rendering of an animation.

Figure 7B:
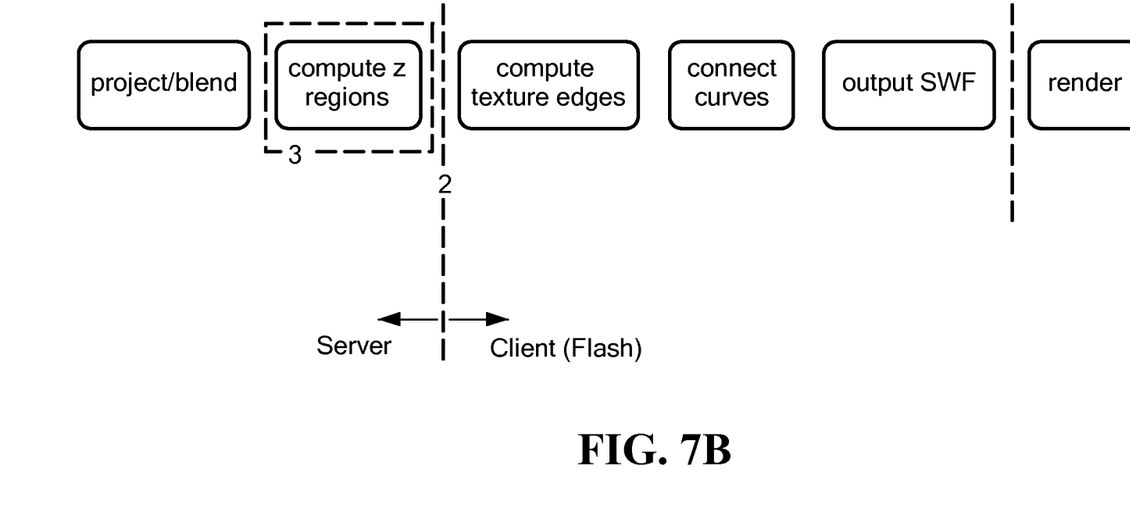
FIG. 7B is a diagrammatic view of one embodiment of how the process described may be split between a client and a server.
Figure 8A:
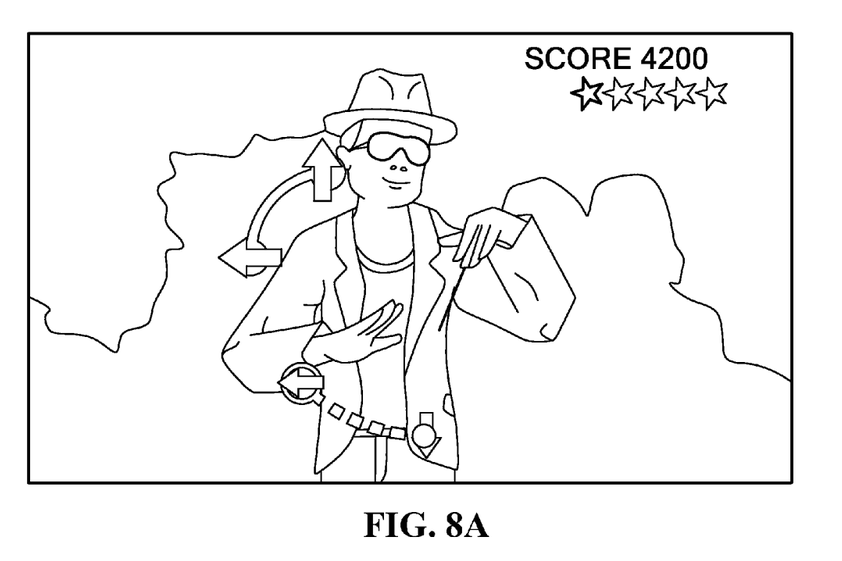
FIGS. 8A and 8B are screenshots of a rhythm-action game created using the described techniques.
Figure 8B:
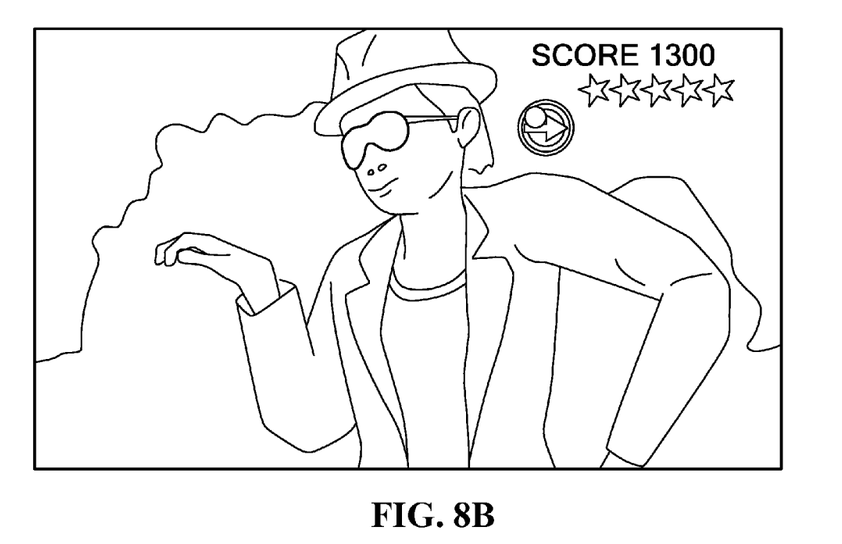

Referring now to FIG. 7B, a diagram showing one embodiment of how the described processes may be split between a client and a server is shown. As shown in FIG. 7B, the projection and z-region computation is performed by a server. The client receives data describing the z-regions and computes texture edges, comments any curves and, ultimately, renders the three dimensional objects. FIGS. 8A and 8B are screenshots showing an embodiment of a rhythm-action game created using these techniques. Games in other genres may be created using these techniques, including first-person shooters, platformers, puzzlers, survival-horror, real-time strategy, sports simulations, racing simulations, flight simulations and role-playing games.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

The invention claimed is:

1. A method comprising:
    associating a three-dimensional mesh with a two-dimensional image that depicts at least a portion of a three-dimensional object;
    generating a vector-based texture map that lists endpoints of a color boundary within the two-dimensional image that depicts at least the portion of the three-dimensional object,
        the generating of the vector-based texture map being performed by a processor;
    applying the vector-based texture map that lists the endpoints of the color boundary to the three-dimensional mesh associated with the two-dimensional image that depicts at least the portion of the three-dimensional object; and
    rendering the vector-based texture map applied to the three-dimensional mesh associated with the two-dimensional image that depicts at least the portion of the three-dimensional object,
        the rendering of the vector-based texture map being on a two-dimensional display screen to represent the three-dimensional object.

2. A system comprising:
    an association module stored in a memory and configured to associate a three-dimensional mesh with a two-dimensional image that depicts at least a portion of a three-dimensional object;
    a processor configured by a mapping module to generate a vector-based texture map that lists endpoints of a color boundary within the two-dimensional image that depicts at least the portion of the three-dimensional object; and
    a renderer stored in the memory and configured to
        apply the vector-based texture map that lists the endpoints of the color boundary to the three-dimensional mesh associated with the two-dimensional image that depicts at least the portion of the three-dimensional object, and to
        render the vector-based texture map applied to the three-dimensional mesh associated with the two-dimensional image that depicts at least the portion of the three-dimensional object,
            the rendering of the vector-based texture map being on a two-dimensional display screen to represent the three-dimensional object.

3. The method of claim 1, wherein:
the vector-based texture map includes a pair of vertices that define locations of a starting point of a curve that defines the color boundary and an ending point of the curve that defines the color boundary; and
the rendering of the vector-based texture map on the two-dimensional display screen renders the pair of vertices that define the locations of the starting and ending points of the curve that defines the color boundary.

4. The method of claim 1, wherein:
the vector-based texture map lists a plurality of vertices that define further endpoints of a plurality of curves that include a curve that defines the color boundary.

5. The method of claim 1, wherein:
the vector-based texture map lists a plurality of curves that join vertices and define further color boundaries.

6. The method of claim 1, wherein:
the vector-based texture map lists a plurality of curves that include a line segment between two vertices.

7. The method of claim 1, wherein:
the vector-based texture map lists a plurality of curves that include a quadratic bezier that starts at a first vertex, ends at a second vertex, and uses a third vertex as a control point.

8. The method of claim 1, wherein:
the vector-based texture map lists a plurality of curves as including a cubic bezier.

9. The method of claim 1, wherein:
the vector-based texture map lists a fill color defined for at least one of a right side of a curve that defines the color boundary or a left side of the curve that defines the color boundary.

10. The method of claim 1, wherein:
the vector-based texture map lists multiple curves defining a single fill color of a particular area of the vector-based texture map.

11. The method of claim 1, wherein:
the rendering of the vector-based texture map includes:
    cutting the vector-based texture map into multiple triangular pieces having three vertices each; and
    projecting the three vertices of each of the multiple triangular pieces into a screen space.

12. The method of claim 11, wherein:
a triangular piece among the multiple triangular pieces includes a curve that defines the color boundary completely contained within the triangular piece.

13. The method of claim 11, wherein:
a triangular piece among the multiple triangular pieces includes a portion of the color boundary from the vector-based texture map; and
the cutting of the vector-based texture map includes determining the portion of the color boundary by splitting the color boundary at an intersection point defined by an edge of the triangular piece.

14. The method of claim 11, wherein:
the cutting of the vector-based texture map includes creating three new curves that represent three edges of a triangular piece among the multiple triangular pieces.

15. The system of claim 2, wherein:
the vector-based texture map includes a pair of vertices that define locations of a starting point of a curve that defines the color boundary and an ending point of the curve that defines the color boundary; and
the renderer is configured to render the pair of vertices that define the locations of the starting and ending points of the curve that defines the color boundary.

16. The system of claim 2, wherein:
the renderer is configured to:
    cut the vector-based texture map into multiple triangular pieces having three vertices each; and
    project the three vertices of each of the multiple triangular pieces into a screen space.

17. The system of claim 16, wherein:
a triangular piece among the multiple triangular pieces includes a portion of the color boundary from the vector-based texture map; and
the render is configured to determine the portion of the color boundary by splitting the color boundary at an intersection point defined by an edge of the triangular piece.

18. The system of claim 2, wherein:
the render is configured to add a vector control point to a curve that defines the color boundary, the vector control point being added at a location where the curve intersects with at least one of a face of the three-dimensional mesh or a border of the three-dimensional mesh.

19. A non-transitory computer-readable article of manufacture comprising instructions that, when executed by one or more processors of a machine, cause the machine to perform operations comprising:

associating a three-dimensional mesh with two-dimensional image that depicts at least a portion of a three-dimensional object;

generating a vector-based texture map that lists endpoints of a color boundary within the two-dimensional image that depicts at least the portion of the three-dimensional object, the generating of the vector-based texture map being performed by the one or more processors of the machine;

applying the vector-based texture map that lists the endpoints of the color boundary to the three-dimensional mesh associated with the two-dimensional image that depicts at least the portion of the three-dimensional object; and rendering the vector-based texture map applied to the three-dimensional mesh associated with the two-dimensional image that depicts at least the portion of the three-dimensional object, the rendering of the vector-based texture map being on a two-dimensional display screen to represent the three-dimensional object.

20. The non-transitory computer-readable article of manufacture of claim 19, wherein:

the rendering of the vector-based texture map includes:

computing barycentric coordinates of a vertex in a triangular piece of the vector-based texture map; and determining screen coordinates of the vertex based on the barycentric coordinates of the vertex.

* * * * *

UNITED STATES PATENT AND TRADEMARK OFFICE
CERTIFICATE OF CORRECTION

| | | |
|---|---|---|
| PATENT NO. | : 8,629,871 B2 | Page 1 of 1 |
| APPLICATION NO. | : 12/330300 | |
| DATED | : January 14, 2014 | |
| INVENTOR(S) | : O'Brien et al. | |

It is certified that error appears in the above-identified patent and that said Letters Patent is hereby corrected as shown below:

In the Specification:

In column 2, line 67, delete "invention." and insert --invention;--, therefor

In column 3, line 2, after "used;", insert --¶--, therefor

In column 3, line 4, delete "server." and insert --server;--, therefor

In column 3, line 6, delete "images; and" and insert --images;--, therefor

In column 3, line 9, delete "server." and insert --server;--, therefor

In column 4, line 4-5, delete "$\Delta A_1, A_2, A_3,$" and insert --$\Delta A_1 A_2 A_3$,--, therefor In column 4, line 59, delete "A" and insert --triangle A--, therefor In the Claims:

In column 11, line 33, in Claim 2, after "to", insert --:--, therefor

Signed and Sealed this
Twenty-seventh Day of May, 2014

Michelle K. Lee
*Deputy Director of the United States Patent and Trademark Office*